United States Patent [19]

Pass

[11] 3,836,753

[45] Sept. 17, 1974

[54] MAGNETIC CARD READER

[75] Inventor: Raymond Vincent Pass, Camp Hill, Pa.

[73] Assignee: AMP Incorporated, Harrisburg, Pa.

[22] Filed: Oct. 4, 1973

[21] Appl. No.: 403,388

Related U.S. Application Data

[63] Continuation of Ser. No. 205,091, Dec. 5, 1971.

[52] U.S. Cl. ............... 235/61.11 D, 179/100.2 CA, 242/204, 235/61.11 R, 346/74 MC

[51] Int. Cl...... G06k 7.10, G06k 13/24, G11b 5/48, B02c 13/02, G01d 15/08

[58] Field of Search ............. 235/61.11 R, 61.11 A, 235/61.11 D, 61.7 B; 179/100.2 CA, 100.2 C; 340/149 A, 174.1 F; 346/74 MC

[56] References Cited

UNITED STATES PATENTS

| | | | |
|---|---|---|---|
| 3,257,515 | 6/1966 | Nakamatsu | 179/100.2 C |
| 3,562,495 | 2/1971 | Grippi | 235/61.11 A |
| 3,568,952 | 3/1971 | Jager | 242/204 |
| 3,588,379 | 1/1964 | Young | 179/100.2 C |
| 3,611,293 | 10/1971 | Constable | 340/149 A |
| 3,624,360 | 11/1971 | Collier | 235/61.11 R |
| 3,702,192 | 11/1972 | Huber | 179/100.2 CA |

*Primary Examiner*—Daryl L. Cook
*Assistant Examiner*—Robert M. Kilgore
*Attorney, Agent, or Firm*—Gerald K. Kita

[57] ABSTRACT

A reader assembly is disclosed for detecting recorded information carried by credit or identification cards. The reader assembly preferably includes a magnetic transducer for reading conventional magnetic codes. The transducer is moveably mounted in the top or cover plate of the reader assembly, which is hinged to permit ready access to the interior of the reader assembly, for emergency servicing or routine maintenance. A card transport mechanism is provided, which is preferably powered by a reversible D.C. motor. The transport mechanism is activated by insertion of a card into the reader assembly. The mechanism is adjustable to permit the reader to handle cards of varying thicknesses and widths.

12 Claims, 7 Drawing Figures

INVENTOR

RAYMOND VINCENT PASS

BY Gerald K. Kita

ATTORNEY

MAGNETIC CARD READER

This is a continuation of application Ser. No. 205,091 filed Dec. 5, 1971.

BACKGROUND OF THE INVENTION

1. Field of the Invention

This invention relates generally to information handling systems, and more particularly to an apparatus for reading or scanning a card containing magnetically detectable information.

2. Description of the Prior Art

At the present time, virtually all types of goods and services can be purchased on a credit basis. Normally, such credit purchases require the presentation of an identification or credit card which carries certain prescribed information about the prospective purchaser. For example, the credit or identification card may include the prospective purchaser's name and address, or it may simply list his social security number or his account number with a particular credit granting organization.

With the constantly increasing use of such cards, a need has developed for new types of information handling systems designed specifically to process credit cards. In the past, for example, it has often been the practice of merchants to manually record the information contained on a particular credit card, and then telephone a central credit clearing house to determine the status of the account identified by the particular card. Clearly, this process is extremely time consuming, and is particularly inefficient where a large number of sales are to be completed in a short period of time. Consequently, a need exists for an apparatus capable of rapidly reading the information contained on a credit or identification card, and rapidly transferring the information to an automatic accounting or verification facility located at a distance from the locus of the actual sale.

Card readers have been developed in the past to solve this problem, but nearly all have been deficient for many reasons. Some of the card readers developed in the past, for example, have been much too expensive and sophisticated for mass distribution. Others have been found to be too sensitive to environmental conditions, or too delicate to continue proper operation for long periods of time in the hands of ordinary sales personnel.

Consequently, there is a need for a rugged, inexpensive, easily serviceable card reader which can be manufactured in quantity and installed wherever credit sales transactions may occur. It is also highly desirable that such an apparatus should be readily adjustable to accommodate various sizes and types of credit or identification cards, and that the device should be easily serviceable whenever necessary.

SUMMARY OF THE INVENTION

Accordingly, one object of this invention is to provide a new apparatus for handling information bearing cards.

Another object of this invention is to provide a novel card reader assembly that is both rugged and easily serviceable.

Yet another object of this invention is to provide a novel card reader assembly that is inexpensive to produce and maintain.

A still further object of this invention is to provide a card reader assembly that is easily adjustable to accommodate different sizes and thicknesses of information bearing cards.

Briefly, these and other objects of the invention are achieved by providing a card reader having an automatically actuatable card transport mechanism. Upon insertion of a credit or identification card into the device, a motor is actuated which transports the card beneath a reading head at a uniform or constant speed. Once the entire card has passed beneath the reading head, the card is ejected from the machine. The transport mechanism is adjustable to permit cards of various thicknesses to be read without causing damage to the card, or jamming of the transport mechanism. The reading head is movably mounted to insure proper contact pressure with the card being read.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENT

Figure 1:
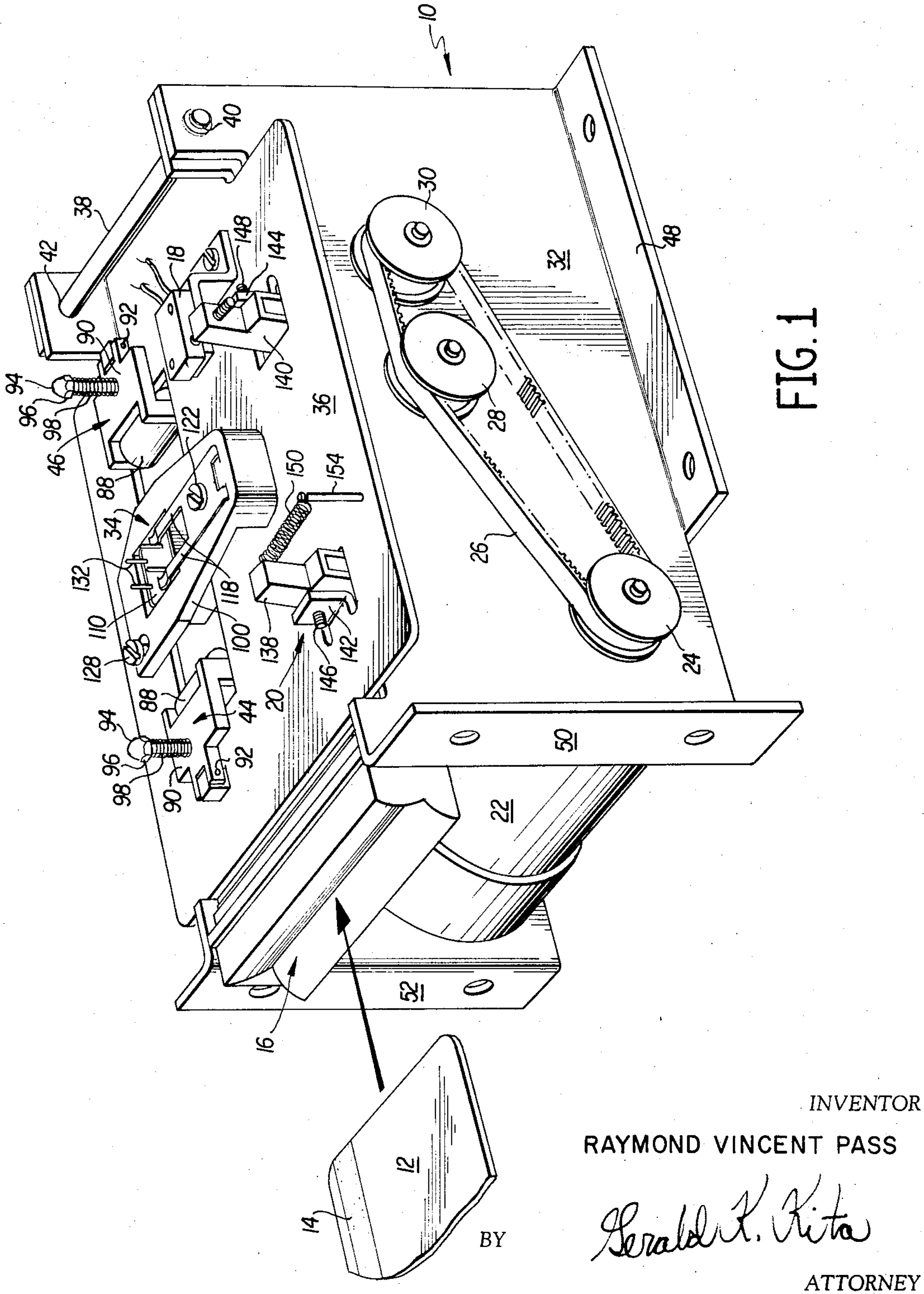
FIG. 1 is a perspective illustration of the card reader assembly of the instant invention.

Referring now to the drawings wherein like reference numerals designate identical or corresponding parts throughout the several views, and more particularly to FIG. 1 thereof, the card reader assembly of the present invention is shown designated generally by the reference numeral 10. A credit or identification card 12, which may be of the conventional plastic variety, is shown positioned to be inserted into the card reading apparatus 10. The card 12 is illustrated as including an information bearing record, such as a magnetic record 14. A card insertion guide 16, which includes an aperture through which the card 12 may pass, is included at one end of the card reader 10 to provide an input structure for cards to be read.

When a card 12 is inserted into the card guide 16, a switch 18 is activated. The switch 18 may be activated by the card 12 engaging a lever assembly 20, for example. The switch 18 controls the operation of a motor 22 which may be a conventional 12 volt, D.C. electric motor, or an equivalent A.C. motor, for example. The motor 22 powers a toothed drive pulley 24 which is coupled through a toothed belt 26 to a pair of toothed transport pulleys 28 and 30, mounted exterior to a side wall 32 of the card reader assembly 10. The use of a toothed belt and pulley drive mechanism prevents slippage between the motor 22 and the remainder of the transport assembly. The transport pulleys cause the card 12 to be driven at a uniform rate past a read head assembly 34, which is mounted to a top plate 36 of the card reader 10.

The top plate 36, and all of the apparatus coupled to it, are secured to the side walls 32 by means of a hinge structure including rotatable shaft 38 having bearing portions 40 and 42 positioned at opposite ends thereof. This assembly permits the top plate 36 to be opened, and readily swung away from the mechanism contained within the side walls 32 of the card reader 10. Thus, if a card should at any time become jammed within the mechanism, or if some other difficulty should arrise, the top plate 36 is merely swung upward, to permit a service attendant to gain access to the jammed card, or to any other internal components of the mechanism. Similarly, the interior surface of the read head and the interior electrical apparatus may be readily inspected or serviced merely by lifting the top plate 36.

A pair of bias roller assemblies 44 and 46 are also secured to the top plate 36. The bias roller assemblies cooperate with the interior transport mechanism to maintain the card 12 in a proper orientation and in firm contact with the transport mechanism as it is driven past the read head 34.

A plurality of mounting flanges 48, 50 and 52, secured to the side wall portions 32 of the card reader assembly, are provided to permit the card reader assembly to be secured to a foundation, or mounted to other card processing equipment. Apertures may be provided in the mounting flanges, so that bolts or rivets may be readily inserted through them.

Figure 2:
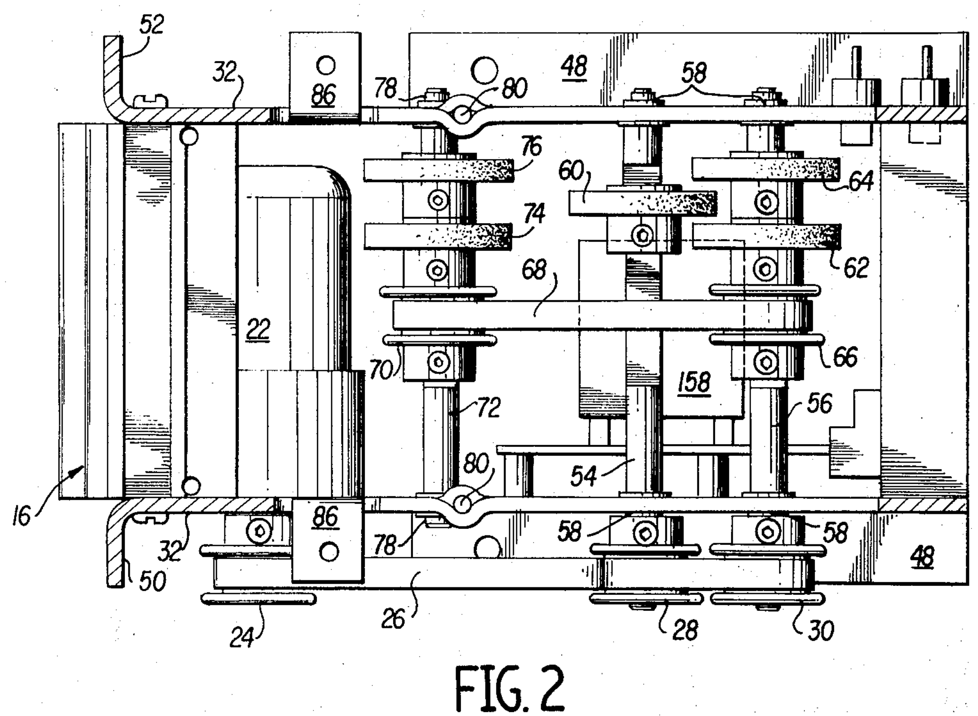
FIG. 2 is a cut-away plan view of the apparatus of the instant invention taken along the line 2—2 of FIG. 3.

Referring now to FIG. 2, the card reader mechanism is shown with the top plate 36 removed. In this condition, the details of the transport mechanism are clearly visible. As shown, the transport pulley 28 is securely fastened to a first drive shaft 54, and the transport pulley 30 is securely coupled to a second drive shaft 56. The drive shafts 54 and 56 are rotatably mounted to the side walls 32 of the card reader 10 by means of appropriate bearings 58. A first card transport wheel 60 is securely fastened to drive shaft 54 for rotation therewith. Similarly, a second and third card transport wheels are securely fastened to drive shaft 56 for rotation therewith. A pulley 66 is also securely fastened to and driven by drive shaft 56. The pulley 66 is coupled by means of a drive belt 68 to a second pulley 70, which is securely fastened to a third drive shaft 72. Thus, driving torque from the motor 22 is transmitted through drive pulley 24 and toothed belt 26 to drive shafts 54 and 56. The motor torque is then transmitted from drive shaft 56 through drive belt 68 to drive shaft 72.

Drive shaft 72 carries fourth and fifth card transport wheels 74 and 76, which are securely fastened to the drive shaft for rotation therewith. All five of the card transport wheels are intended to frictionally engage the input credit card and move it through the card reading assembly. Accordingly, the card transport wheels preferably include at least a surface of a suitable material having a relatively high coefficient of friction. For example, the card transport wheels may carry rubber or suitable plastic tires or peripheral rims for the purpose of engaging input cards.

The drive shaft 72 is mounted to the side walls 32 of the card reader by means of a pair of adjustable bearing assemblies 78. Each adjustable bearing assembly 78 includes a threaded adjusting member 80, illustrated in FIGS. 2 and 3. The threaded adjusting member 80 engage a peripheral portion of drive shaft 72 on a side facing drive shaft 56. Accordingly, by appropriately rotating the threaded adjusting members 80 the drive shaft 72 may be moved slightly farther away from or slightly closer to drive shaft 56. This slight motion permits adjustment of the tension in drive belt 68. Thus, the adjustable bearing assemblies 78 permit the adjustment of the tension on drive belt 68 to prevent slippage due, for example, to belt wear, expansion of the belt due to changing temperature conditions, and to compensate for manufacturing tolerances.

The transport assembly thus illustrated includes a plurality of drive members all of which are securely coupled to one another. This arrangement insures that all components of the transport mechanism always operate at an identical speed. This feature is necessary to prevent errors in the output as coded cards are read by the mechanism. The need for a constant speed drive system could, of course, be eliminated by the use of self clocking coded signals on the cards being read, as will be explained in more detail hereinafter.

Figure 3:
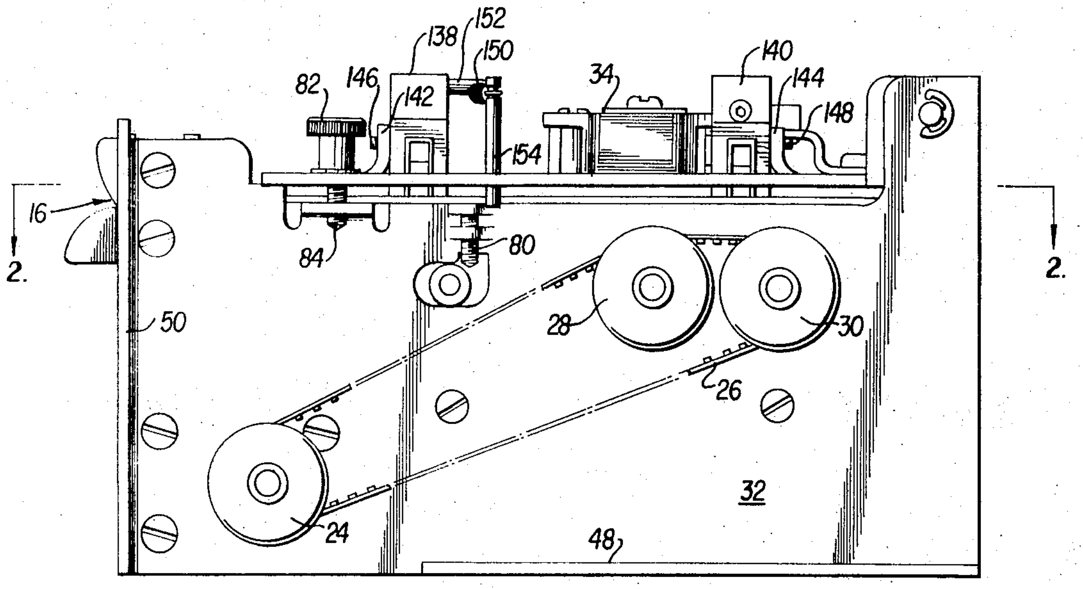
FIG. 3 is a side view of the apparatus illustrated in FIG. 1.
Figure 5:
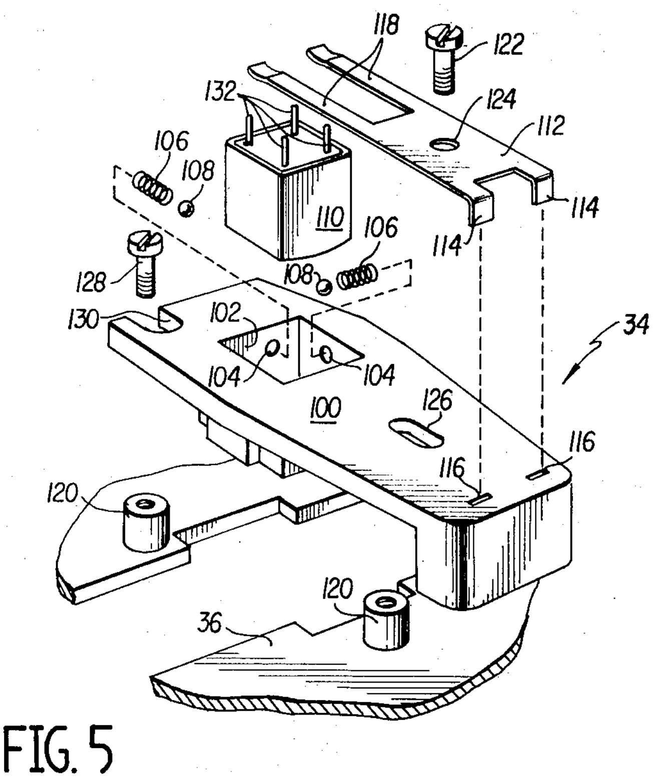
FIG. 5 is an exploded perspective view of the read-head assembly of the present invention.

As illustrated in FIGS. 3 and 5, a pair of knurled fasteners 82 may be provided to fix the top plate 36 in place. The knurled fasteners 82 are constructed such that they may be loosened or tightened without a need for tools. Each of the knurled fasteners 82 includes a threaded leg portion 84 extending therefrom. The threaded leg portion 84 of each knurled fastener 82 may be inserted through a suitable aperture in cover plate 36 to engage one of a pair of apertured ear portions 86 integral with side walls 32 of the card reader 10. The apertured ear portions may include internal threads to cooperate with the threaded leg portions 84, permitting each of the knurled fasteners to be securely screwed into the ear portions 86, thereby holding the top plate 36 firmly in place.

Figure 4:
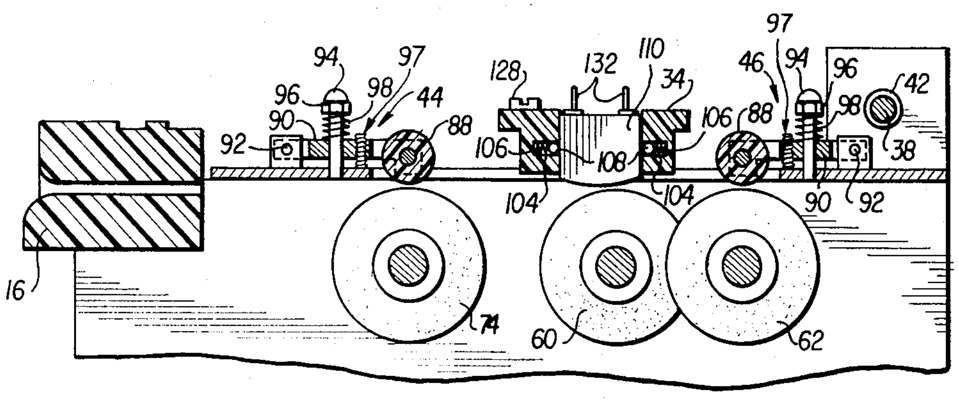
FIG. 4 is a cut-away side view of a portion of the apparatus of the present invention taken along the line 4—4 of FIG. 7.

Referring now to FIG. 4, the manner in which the bias roller assemblies 44 and 46 cooperate with the transport mechanism is illustrated in greater detail. In particular, each of the bias roller assemblies includes an elongated roller 88 rotatably mounted in an L-shaped framework. Each of the L-shaped frameworks is pivotally mounted to the top plate 36 by means of a mounting pin and bearing assembly 92. A bolt 94 is slidably inserted through an aperture in the L-shaped framework 90 and held captive by conventional fastening techniques in the top plate 36. Adjusting nuts 96 are threaded onto the bolts 94. In the drawings, the adjusting nuts are illustrated as positioned near the heads of the bolts 94. However, since the bolts 94 are threaded over their entire lengths, the adjusting nuts 96 may be selectively positioned at essentially any location on the bolts 94. Coil springs 98 are positioned around the bolts 94, engaging the adjusting nuts 96 at one end thereof and engaging the surface of the L-shaped frameworks 90 at the other end thereof. Thus, by appropriately positioning the adjusting nuts 96, varying forces can be exerted on the L-shaped frameworks 90, depending upon the compression of coil springs 98. Accordingly, adjustment of the adjusting nuts 96 permits adjustment of the tension on the elongated rollers 88.

As shown in FIG. 4, the elongated rollers 88 cooperate with the card transport wheels 62, 64, 74 and 76. Accordingly, by appropriately adjusting the position of threaded members 97, the gap between elongated rollers 88 and the card transport wheels can be adjusted. This feature renders the card reader assembly 10 adjustable to permit it to accept cards of widely varying thicknesses.

Referring now to FIG. 5, the structure of the read head assembly 34 is shown in greater detail. The read head assembly 34 includes a head mounting frame 100 which includes a rectangular head mounting aperture 102. Within the walls of the head mounting aperture 102, a plurality of cylindrical bores 104 are provided. Four such bores 104 may be provided, for example, one positioned in the center of each wall of the head mounting aperture 102. Clearly, a greater or lesser number of bores 104 may be provided depending upon engineering expediency. Within each of the bores 104 is positioned a ball-biasing coil spring 106 and a ball bearing 108. The read head 110 is then inserted into the read head aperture 102, to maintain the ball bearings 108 in place. Clearly, the ball bearings 108 permit the read head 110 to move freely in the direction of the axis of the head mounting aperture 102.

A head mounting clamp 112 holds the read head 110 in the had mounting aperture 102. The head mounting clamp 112 includes a pair of depending foot portions 114 which are inserted into appropriately sized slots 116 in the head mounting frame 100 to secure the head mounting clamp 112 in appropriate orientation. The head mounting clamp 112 also includes a pair of resilient fingers 118 which engage the read head assembly 110 and bias it toward the card transport wheel 60 which is positioned beneath the read head. The resilient fingers 118 urge the read head 110 into contact with the magnetic record 14 carried by the card 12.

A pair of interiorly threaded fixtures 120 are secured to the upper surface of top plate 36 to permit the head assembly 34 to be secured to the top plate. A first screw 122 is inserted through an aperture 124 in the head mounting clamp 112, and through a second elongated aperture 126 in the head mounting frame 100, and is subsequently screwed into one of the threaded fixtures 120. A second screw with an eccentric head 128 is inserted through a U-shaped aperture 130 in the head mounting frame 100 to be screwed into the remaining threaded fixture 120. In this manner, the entire head mounting assembly is secured to the top plate 36, and adjustable for read head gap alignment.

The read head 110 is preferably a conventional magnetic reading head of the type well-known to those skilled in the art. This type of head produces electrical signals corresponding to information appropriately recorded in a magnetic medium passing beneath the head. In the case of the present invention, the magnetic medium is the magnetic record 14 imprinted on the card 12, which is transported beneath the read head 110. A plurality of output pins 132 are provided in the upper surface of the read head 110 to permit transmission of the electrical signals generated by the read head to other appropriate processing equipment. For example, the output pins 132 of the read head 110 may be coupled to a transmission line to allow output signals to be transmitted to remote accounting or account verification equipment, as previously described.

Figure 6:
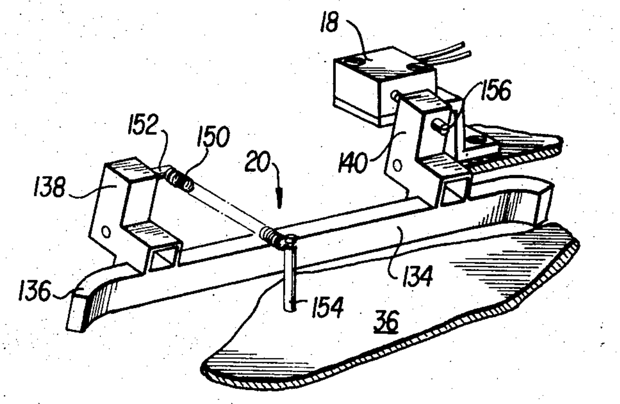
FIG. 6 is a perspective illustration of the card actuated switch assembly of the present invention; and, FIG. 7 is a plan view of the apparatus illustrated in FIG. 1.
Figure 7:
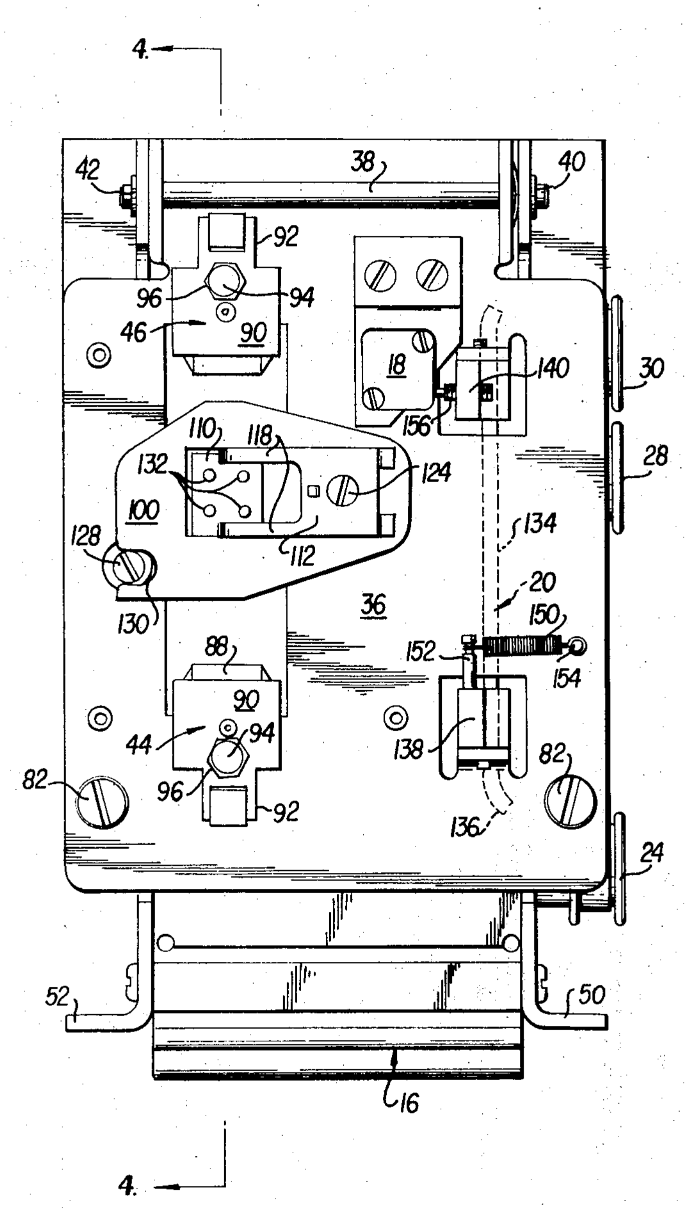

Referring now to FIGS. 6 and 7, the structure of the switch lever assembly 20 is shown in greater detail. More particularly, the lever assembly 20 includes a pressure guide bar 134 adapted to be engaged by one edge of a card 12 as it is inserted into the card reader 10. The pressure guide bar 134 includes a curved foot portion 136 for engaging the leading edge of the card 12 as it is inserted into the card reader. A pair of L-shaped mounting arms 138 and 140 are secured to the pressure guide bar 134 near either end thereof. The L-shaped mounting arms 138 and 140 are pivotally mounted to the top plate 36 by means of a pair of upstanding mounting ears 142 and 144 and a pair of pivot pins 146 and 148 extending through the ears (see FIG. 1). The pivot pins 146 and 148 support the pressure guide bar 134 for swinging motion about an axis which is parallel to the axis of the pressure guide bar itself. A biasing spring 150 is mounted between a peg 152 secured to L-shaped mounting arm 138 and a peg 154 mounted on top plate 36. The biasing spring 150 serves to rotate the pressure guide bar 134 in a clockwise direction about its mounting axis, forcing it into the path of any card which is inserted into the card reader assembly.

The L-shaped mounting arm 140 carries an adjustable switch actuating pin 156 for actuating switch 18 upon a suitable motion of the pressure guide bar 134. The switch actuating pin 156 is threaded to allow a wide range of adjustment in the actuation of switch 18. The adjustment of the switch actuating pin 156 enables the card reader assembly to handle cards of different widths.

In operation, a card 12 is inserted into the aperture in the card insertion guide 16. When the card is inserted sufficiently far to engage the first pair of transport wheels 74 and 76, one edge of the card will abut the curved foot portion 136 of pressure guide bar 134. As the card is inserted slightly further, the pressure guide bar will be pivoted in a counter clockwise direction, causng the actuation of switch 18. When actuated, switch 18 supplies power from a source (not shown) which triggers a polarity reversing relay 158 (see FIG. 2). The relay switches on the motor 22, causing the transport mechanism to be activated. The transport mechanism carries the card 12 past the read head 110 at a uniform rate of speed, permitting the information contained on the card to be readout by the read head. In certain applications, the addition of an end-of-travel switch may be incorporated which when activating, the relay 158 causes the motor 22 to reverse its direction of rotation. Consequently, the transport mechanism is reversed, and the card 12 is ejected from the card reader, emerging from the card insertion guide 16. The electrical circuit required to interconnect the motor, power source, switch 18 and relay 158 is considered conventional, and will be obvious to those skilled in the art. Accordingly, the circuit will not be discussed in detail.

A variety of alternative structures may be used with the card reader of the present invention. For example, rather than using a relay to reverse the direction of the motor 22 and eject the card 12 from the input aperture, the apparatus could be modified to eject the card from the opposite end of the reader. In addition, rather than employing individual wheels in the transport mechanism, a relatively wide conveyer belt could be used.

The conveyer belt could be placed around the card transport wheels illustrated in FIG. 2, for example.

As an alternative to resiliently mounting the read head 110, the read head could be rigidly mounted, and the axles of the transport assembly could be resiliently mounted, although this structure would be somewhat more complex than that of the preferred embodiment, illustrated in the drawings.

The motor 22 may be either an AC synchronous motor, or a DC motor, as long as it is capable of quick starting and rapid reversal.

The magnetic read head could be replaced with an optical reader or some other equivalent system, although the magnetic reader is believed to be the most reliable, economical and convenient system.

In addition, the cards 12 may carry a self-clocking coded record, thereby reducing the need for a constant speed transport mechanism.

Obviously, numerous additional modifications and variations of the present invention are possible in light of the above teachings. It is therefore to be understood that within the scope of the appended claims the invention may be practiced otherwise than as specifically described herein. Accordingly,

What is claimed as new and desired to be secured by letters patent of the United States is:

1. A reader assembly for detecting recorded information carried by a card, comprising:
- transducer means for sensing said recorded information;
- transport means for producing relative motion in a first direction between said card and said transducer means, said transport means adapted to operate in cyclic fashion;
- said transport means and said transducer means mounted to permit relative motion toward or away from said card in a second direction perpendicular to said first direction and perpendicular to a principal surface of said card, wherein said transducer means is mounted to permit motion in said second direction, and said transport means is mounted to prevent motion in said second direction;
- biasing means engaging said transducer means for normally biasing said transducer means in said second direction toward said principal surface of said card,
- control means coupled to said transport means for automatically controlling operating cycles of said transport means, said control means responsive to insertion of a card into said reader assembly for initiating an operating cycle of said transport means; and,
- said control means including switching means for terminating an operating cycle of said transport means after a predetermined travel.

2. A reader assembly for detecting recorded information carried by a card, as in claim 1, further comprising:
- frame means for supporting said reader assembly, said frame means including side wall portions,
- said transport means mounted to said frame means; and
- top plate means rotatably mounted to said frame means for selectively concealing or exposing at least a portion of said transport means.

3. A reader assembly for detecting recorded information carried by a card, as in claim 2, wherein:
- said transducer means is mounted on ball bearing; and,
- means are provided for biasing said transducer means in said second direction toward said transport means.

4. A reader assembly for detecting recorded information carried by a card, as in claim 3, wherein:
- said transport means includes motor means; and,
- a plurality of rotatably mounted card carrying means coupled in a non-slipping manner to said motor means.

5. A reader assembly for detecting recorded information carried by a card, as in claim 4, wherein:
- said transport means includes driven means for supporting and transporting said card; and,
- biasing means for urging said card into engagement with said driven means.

6. A reader assembly for detecting recorded information carried by a card, as in claim 5, wherein:
- said biasing means is selectively adjustable for permitting said reader assembly to handle cards of varying thicknesses.

7. A reader assembly for detecting recorded information carried by a card, as in claim 4, wherein:
- said transport means further includes
- rotatably mounted axel means,
- card engaging means coupled to said rotatably mounted axel means,
- belt means coupling said rotatably mounted axel means with at least one of said rotatably mounted card carrying means; and,
- adjustment means engaging said rotatably mounted axel means for selectively varying tension in said belt means.

8. A reader assembly for detecting recorded information carried by a card, as in claim 4, wherein:
- said control means includes;
- means for reversing
- said transport means.

9. A reader assembly for detecting recorded information carried by a card, as in claim 8, wherein:
- said reversing means includes
- a D. C. electric motor and
- means for reversing the energization of said D. C. electric motor.

10. A reader assembly for detecting recorded information carried by a card, as in claim 8, wherein:
- said control means includes
- an operating cycle initiating switch means,
- sad operating cycle initiating switch means adapted to be activated by engagement with said card.

11. A reader assembly for detecting recorded information carried by a card, as in claim 10, wherein:
- said operating cycle initiating switch means includes
- guide bar means adapted to be engaged by said card; and,
- adjustable switch activating means for permitting said reader assembly to handle cards of differing widths.

12. A reader assembly for detecting recorded information carried by a card comprising:
- transducer means for sensing said recorded information;
- transport means for producing relative motion in a first direction between said card and said transducer means, said transport means adapted to operate in cyclic fashion;

frame means for supporting said reader assembly and said transport means;

top plate means rotatably mounted to said frame means for selectively concealing or exposing at least a portion of said transport means;

a head mounting frame secured to said top plate, and including a head mounting aperture therein, said head mounting aperture having a longitudinal axis which is perpendicular to said first direction;

bearing members resiliently mounted in said head mounting frame and positioned adjacent inner surfaces of said head mounting aperture, a read head for detecting said magnetically recorded information slidably mounted within said head mounting aperture, said bearing members engaging peripheral portions of said read head and permitting said read head to slide easily within said aperture for accommodating cards of various thicknesses;

head biasing means secured to said head mounting frame for biasing said read head toward said transport assembly;

said transport means and said transducer means mounted to permit relative motion therebetween in a second direction perpendicular to said first direction wherein said transducer means is mounted to permit motion in said second direction and said transport means is mounted to prevent motion in said second direction;

said transport means including motor means, a shaft rotatably driven by said motor means, a pair of rotatably mounted axle means for carrying a plurality of rotatable card carrying means, first belt means for coupling said driven shaft and one of said pair of axle means, second belt means for coupling said one of said pair of axle means to the other of said pair of axle means, selectively adjustable biasing means for urging said card into engagement with said plurality of rotatable card carrying means, and adjustment means engaging said other of said pair of axle means for selectively varying the tension within said second belt means; and, control means coupled to said transport means for automatically controlling operating cycles of said transport means, said control means being responsive to insertion of said card into said reader assembly for initiating an operating cycle of said transport means and including switching means for terminating an operating cycle of said transport means after a predetermined travel.

* * * * *